(12) United States Patent
Hoson (10) Patent No.: US 10,007,814 B2
(45) Date of Patent: Jun. 26, 2018

(54) CARD READER AND CONTROL METHOD FOR CARD READER

(71) Applicant: NIDEC SANKYO CORPORATION, Suwa-gun, Nagano (JP)

(72) Inventor: Keiji Hoson, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days. days.

(21) Appl. No.: 15/304,972

(22) PCT Filed: Apr. 17, 2015

(86) PCT No.: PCT/JP2015/061857
§ 371 (c)(1),
(2) Date: Oct. 18, 2016

(87) PCT Pub. No.: WO2015/159974
PCT Pub. Date: Oct. 22, 2015

(65) Prior Publication Data
US 2017/0185811 A1    Jun. 29, 2017

(30) Foreign Application Priority Data

Apr. 18, 2014 (JP) .................................. 2014-086084

(51) Int. Cl.
*G06K 7/08* (2006.01)
*G06K 7/00* (2006.01)

(52) U.S. Cl.
CPC .......... *G06K 7/087* (2013.01); *G06K 7/0008* (2013.01); *G06K 7/0091* (2013.01); *G06K 7/0095* (2013.01); *G06K 7/084* (2013.01)

(58) Field of Classification Search
CPC .... G06K 7/087; G06K 7/0008; G06K 7/0091; G06K 7/0095; G06K 7/084
See application file for complete search history.

(56) References Cited

U.S. PATENT DOCUMENTS 6,422,475 B1 * 7/2002 May ...................... G07F 19/20
235/482
9,727,850 B2 * 8/2017 Severson ............... G06Q 20/18
(Continued)

FOREIGN PATENT DOCUMENTS

JP         H08272922 A     10/1996
JP         2013037555 A    2/2013
(Continued)

OTHER PUBLICATIONS

International Search Report corresponding to Application No. PCT/JP2015/061857; dated Jun. 16, 2015, with English translation.

*Primary Examiner* — Thien M Le
*Assistant Examiner* — Asifa Habib
(74) *Attorney, Agent, or Firm* — Cantor Colburn LLP (57) ABSTRACT

A card reader may include a card insertion part comprising a card insertion port is formed; a plurality of metal sensors structured to detect whether a foreign matter including metal material has been attached near the card insertion part; and a control section with which the plurality of the metal sensors are connected. The metal sensor may include a core formed of magnetic material and an excitation coil and a detection coil which are wound around the core. The control section may be structured to supply a current to each of the excitation coils of the plurality of the metal sensors at different timings.

10 Claims, 6 Drawing Sheets

(56) References Cited

U.S. PATENT DOCUMENTS

| | | | | |
|---|---|---|---|---|
| 2009/0159676 A1* | 6/2009 | Schliebe | ............... | G06K 7/084 235/436 |
| 2014/0158768 A1* | 6/2014 | Ray | ....................... | H04K 3/825 235/449 |

FOREIGN PATENT DOCUMENTS

| | | | |
|---|---|---|---|
| JP | 2014186479 A | 10/2014 | |
| WO | 2011093340 A1 | 8/2011 | |

\* cited by examiner

CARD READER AND CONTROL METHOD FOR CARD READER

CROSS REFERENCE TO RELATED APPLICATIONS

This is the U.S. national stage of application No. PCT/JP2015/061857, filed on Apr. 17, 2015. Priority under 35 U.S.C. § 119(a) and 35 U.S.C. § 365(b) is claimed from Japanese Application No. 2014-086084, filed Apr. 18, 2014, the disclosure of which is incorporated herein by reference.

TECHNICAL FIELD

At least an embodiment of the present invention relates to a card reader structured to perform reading of data recorded in a card and/or recording data to a card. Further, at least an embodiment of the present invention relates to a control method for the card reader.

BACKGROUND

Conventionally, a card reader has been widely utilized which is structured to perform reading of magnetic data recorded in a card and/or recording magnetic data to a card. In an industry such as a financial institution where a card reader is utilized, so-called skimming, that is, a criminal attaches a magnetic head to a card insertion part of a card reader and illegally acquires magnetic data of a card by the magnetic head, has conventionally become a large issue. Therefore, a card reader has been proposed which includes a metal sensor for detecting that a magnetic head for skimming (hereinafter, referred to as a "skimming magnetic head") has been attached to a card insertion part (see, for example, Patent Literature 1). In the card reader described in Patent Literature 1, the metal sensor includes a core formed of magnetic material and a pair of excitation coils and a detection coil which are wound around the core. The metal sensor is disposed in an inside of the card insertion part formed in a hollow shape.

PATENT LITERATURE

[PTL 1] Japanese Patent Laid-Open No. 2013-37555

In the card reader described in Patent Literature 1, when a plurality of metal sensors are disposed in an inside of the card insertion part, a detection range of a skimming magnetic head can be widened and, as a result, skimming can be prevented effectively. However, when a distance between the metal sensors is close, even if a skimming magnetic head is not attached to the card insertion part, erroneous detection may occur that a skimming magnetic head has been attached to the card insertion part.

Next, the problem will be specifically described below as an example in a case that two metal sensors are disposed in an inside of the card insertion part and a distance between the two metal sensors is close. In the following descriptions, one of two metal sensors is referred to as a first metal sensor, the other is referred to as a second metal sensor, an excitation coil of the first metal sensor is referred to as a first excitation coil, a detection coil of the first metal sensor is as a first detection coil, an excitation coil of the second metal sensor is as a second excitation coil, a detection coil of the second metal sensor is as a second detection coil.

Figure 7:
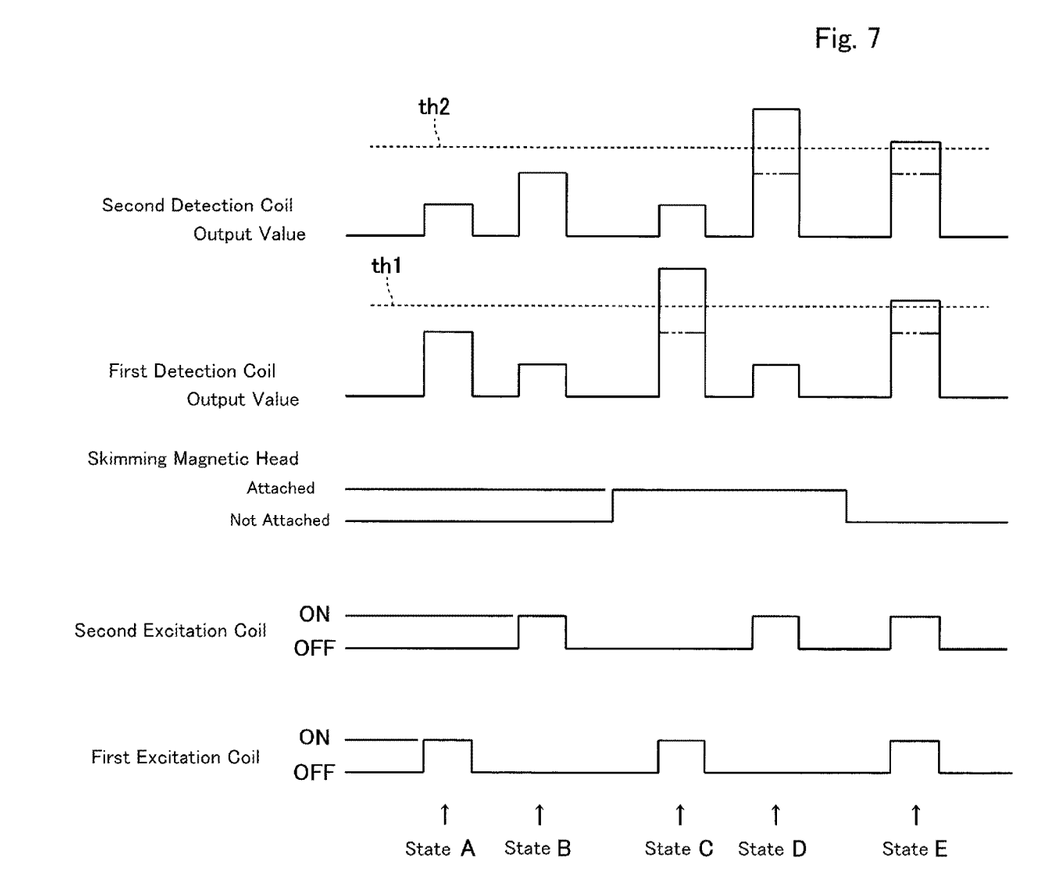
FIG. 7 is a view for explaining a problem of a conventional technique.

When a current is supplied to only the first excitation coil in a case that a skimming magnetic head is not attached to a card insertion part, for example, as shown in the "state A" in FIG. 7, an output value of the first detection coil rises to a value which does not exceed a detection threshold value "th1" for a skimming magnetic head. Further, since the distance between the first metal sensor and the second metal sensor is close (in other words, since the distance between the first excitation coil and the second detection coil is close), in this case, an output value of the second detection coil also rises to a value which does not exceed a detection threshold value "th2" for the skimming magnetic head and is smaller than the output value of the first detection coil due to influence of the magnetic field generated by the first excitation coil.

Similarly, when a current is supplied to only the second excitation coil in a case that a skimming magnetic head is not attached to the card insertion part, for example, as shown in the "state B" in FIG. 7, an output value of the second detection coil rises to a value which does not exceed the detection threshold value "th2". Further, an output value of the first detection coil also rises to a value which does not exceed the detection threshold value "th1" and is smaller than the output value of the second detection coil due to influence of the magnetic field generated by the second excitation coil.

Further, when a current is supplied to only the first excitation coil in a case that a skimming magnetic head has been attached near the first metal sensor in the card insertion part, for example, as shown in the "state C" in FIG. 7, an output value of the first detection coil rises to a value exceeding the detection threshold value "th1" and an output value of the second detection coil also rises to a value which does not exceed the detection threshold value "th2" due to influence of the magnetic field generated by the first excitation coil. Similarly, when a current is supplied to only the second excitation coil in a case that a skimming magnetic head has been attached near the second metal sensor in the card insertion part, for example, as shown in the "state D" in FIG. 7, an output value of the second detection coil rises to a value exceeding the detection threshold value "th2" and an output value of the first detection coil also rises to a value which does not exceed the detection threshold value "th1" due to influence of the magnetic field generated by the second excitation coil. Therefore, in a case that a current is supplied to only the first excitation coil and, in a case that a current is supplied to only the second excitation coil, it can be appropriately detected that a skimming magnetic head has been attached to a card insertion part based on an output value of the first detection coil and an output value of the second detection coil.

However, when a current is supplied to the first excitation coil and the second excitation coil in a case that a skimming magnetic head is not attached to a card insertion part, for example, as shown in the "state E" in FIG. 7, it may be occurred that an output value of the first detection coil rises to a value exceeding the detection threshold value "th1" and an output value of the second detection coil rises to a value exceeding the detection threshold value "th2" due to influence of the magnetic field generated by the first excitation coil and influence of the magnetic field generated by the second excitation coil. In other words, in a case that a distance between two metal sensors disposed in an inside of the card insertion part is close, when a current is supplied to the first excitation coil and the second excitation coil, erroneous detection may occur that a skimming magnetic head has been attached to the card insertion part even if a skimming magnetic head is not attached to the card insertion part.

If a distance between the two metal sensors is widened, the problem can be prevented. However, the position to which a skimming magnetic head is attached is that where a magnetic stripe formed on a card is passed (in other words, the position where a skimming magnetic head is attached is specified) and thus, when a distance between the metal sensors is widened, a distance between the skimming magnetic head and the metal sensor may become longer. Further, when a distance between the skimming magnetic head and the metal sensor becomes longer, even in a case that two metal sensors are disposed in an inside of the card insertion part, it is difficult to fully exhibit detection abilities of the two metal sensors.

SUMMARY

In view of the problem described above, at least an embodiment of the present invention is to provide a card reader which is capable of preventing erroneous detection that a foreign matter including metal material has been attached to a card insertion part even when a plurality of metal sensors is provided for detecting that a foreign matter including metal material such as a skimming magnetic head has been attached to the card insertion part and, in addition, even when a distance between a plurality of the metal sensors is close. Further, at least an embodiment of the present invention is to provide a control method for a card reader which is capable of preventing erroneous detection that a foreign matter including metal material has been attached to a card insertion part even when a plurality of metal sensors is provided for detecting that a foreign matter including metal material has been attached to the card insertion part and, in addition, even when a distance between a plurality of the metal sensors is close.

To solve the above-mentioned problem, at least an embodiment of the present invention provides a card reader including a card insertion part in which a card insertion port is formed, a plurality of metal sensors structured to detect that a foreign matter including metal material has been attached near the card insertion part, and a control section with which the plurality of the metal sensors are connected. The metal sensor includes a core formed of magnetic material and an excitation coil and a detection coil which are wound around the core, and the control section supplies a current to each of the excitation coils of the plurality of the metal sensors at different timings.

In the card reader in at least an embodiment of the present invention, the control section supplies a current to each of the excitation coils of a plurality of the metal sensors at different timings. Therefore, according to at least an embodiment of the present invention, in a case that it is detected by one metal sensor whether a foreign matter including metal material such as a skimming magnetic head has been attached to a card insertion part or not, it is capable of appropriately detecting whether a foreign matter including metal material has been attached to the card insertion part or not based on a variation of a magnetic field generated by the excitation coil of the one metal sensor without being affected by a magnetic field generated by the excitation coil of another metal sensor. Accordingly, in at least an embodiment of the present invention, even when a plurality of metal sensors is provided in the card reader for detecting that a foreign matter including metal material has been attached to the card insertion part and, in addition, even when a distance between a plurality of the metal sensors is close, erroneous detection that a foreign matter including metal material has been attached to a card insertion part is capable of being prevented.

In at least an embodiment of the present invention, the card reader includes, for example, a first metal sensor and a second metal sensor as the metal sensor, the first metal sensor includes a first excitation coil as the excitation coil and a first detection coil as the detection coil, the second metal sensor includes a second excitation coil as the excitation coil and a second detection coil as the detection coil, and the control section alternately supplies a current to the first excitation coil and the second excitation coil.

In at least an embodiment of the present invention, it is preferable that the control section determines whether the second metal sensor is disposed at a normal position or not based on an output value of the first detection coil when the current is supplied to the second excitation coil, and that the control section determines whether the first metal sensor is disposed at a normal position or not based on an output value of the second detection coil when the current is supplied to the first excitation coil. According to this structure, even when a structure is not separately provided for detecting that the first metal sensor and the second metal sensor have not been detached illegally, it is capable of detecting that the second metal sensor is not detached illegally based on an output value of the first detection coil, and it is capable of detecting that the first metal sensor is not detached illegally based on an output value of the second detection coil. Therefore, a structure of the card reader can be simplified.

Further, to solve the above-mentioned problem, at least an embodiment of the present invention provides a card reader including a card insertion part in which a card insertion port is formed, a plurality of metal sensors structured to detect that a foreign matter including metal material has been attached near the card insertion part, and a plurality of control sections with which the plurality of the metal sensors is respectively connected. The metal sensor includes a core formed of magnetic material and an excitation coil and a detection coil which are wound around the core, and the plurality of the control sections supplies a current to each of the excitation coils of the plurality of the metal sensors at different timings.

In the card reader in at least an embodiment of the present invention, a plurality of the control sections supplies a current to each of the excitation coils of the plurality of the metal sensors at different timings. Therefore, according to at least an embodiment of the present invention, in a case that it is detected by one metal sensor whether a foreign matter including metal material such as a skimming magnetic head has been attached to a card insertion part or not, it is capable of appropriately detecting whether a foreign matter including metal material has been attached to the card insertion part or not based on a variation of a magnetic field generated by the excitation coil of the one metal sensor without being affected by a magnetic field generated by the excitation coil of another metal sensor. Accordingly, in at least an embodiment of the present invention, erroneous detection that a foreign matter including metal material has been attached to a card insertion part can be prevented even when a plurality of metal sensors is provided in the card reader for detecting that a foreign matter including metal material has been attached to the card insertion part and, in addition, even when a distance between a plurality of the metal sensors is close.

In at least an embodiment of the present invention, it is preferable that the card reader includes a first metal sensor and a second metal sensor as the metal sensor and, as the control section, a first control section with which the first metal sensor is connected and a second control section with which the second metal sensor is connected, and the first metal sensor includes a first excitation coil as the excitation coil and a first detection coil as the detection coil, and the second metal sensor includes a second excitation coil as the excitation coil and a second detection coil as the detection coil. In addition, the first control section determines whether supply of a current to the second excitation coil is stopped or not based on an output value of the first detection coil when supply of a current to the first excitation coil is stopped and, when the first control section determines that the supply of the current to the second excitation coil is stopped, the first control section starts supply of a current to the first excitation coil, and the second control section determines whether supply of a current to the first excitation coil is stopped or not based on an output value of the second detection coil when supply of a current to the second excitation coil is stopped and, when the second control section determines that the supply of the current to the first excitation coil is stopped, the second control section starts supply of a current to the second excitation coil. According to this structure, a signal for notifying that supply of a current to the first excitation coil is stopped and a signal for notifying that supply of a current to the second excitation coil is stopped are not required to transmit between the first control section and the second control section. Therefore, the number of signal lines between the first control section and the second control section can reduced and, as a result, a structure of the card reader can be simplified.

In at least an embodiment of the present invention, it is preferable that the first control section determines whether the second metal sensor is disposed at a normal position or not based on an output value of the first detection coil when a current is supplied to the second excitation coil, and the second control section determines whether the first metal sensor is disposed at a normal position or not based on an output value of the second detection coil when a current is supplied to the first excitation coil. According to this structure, even when structures for detecting that the first metal sensor and the second metal sensor are not detached illegally are not separately provided, it is capable of detecting that the second metal sensor is not detached illegally based on an output value of the first detection coil, and it is capable of detecting that the first metal sensor is not detached illegally based on an output value of the second detection coil. Therefore, a structure of the card reader can be simplified.

In addition, to solve the above-mentioned problem, at least an embodiment of the present invention provides a control method for a card reader including a card insertion part in which a card insertion port is formed, and a plurality of metal sensors structured to detect that a foreign matter including metal material has been attached near the card insertion part. The metal sensor includes a core formed of magnetic material and an excitation coil and a detection coil which are wound around the core. In the control method for the card reader, a current is supplied to each of the excitation coils of the plurality of the metal sensors at different timings.

In the control method for a card reader in at least an embodiment of the present invention, a current is supplied to each of the excitation coils of a plurality of metal sensors at different timings. Therefore, according to at least an embodiment of the present invention, in a case that it is detected by one metal sensor whether a foreign matter including metal material such as a skimming magnetic head has been attached to a card insertion part or not, it is capable of appropriately detecting whether a foreign matter including metal material has been attached to the card insertion part or not based on a variation of a magnetic field generated by the excitation coil of the one metal sensor without being affected by a magnetic field generated by the excitation coil of another metal sensor. Accordingly, in at least an embodiment of the present invention, erroneous detection that a foreign matter including metal material has been attached to a card insertion part can be prevented even when a plurality of metal sensors is provided in the card reader for detecting that a foreign matter including metal material has been attached to the card insertion part and, in addition, even when a distance between a plurality of the metal sensors is close.

As described above, in at least an embodiment of the present invention, erroneous detection that a foreign matter including metal material has been attached to a card insertion part is capable being prevented even when a plurality of metal sensors is provided in the card reader for detecting that a foreign matter including metal material has been attached to the card insertion part and, in addition, even when a distance between a plurality of the metal sensors is close.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention will be described below with reference to the accompanying drawings.

First Embodiment (Structure of Card Reader)

Figure 1:
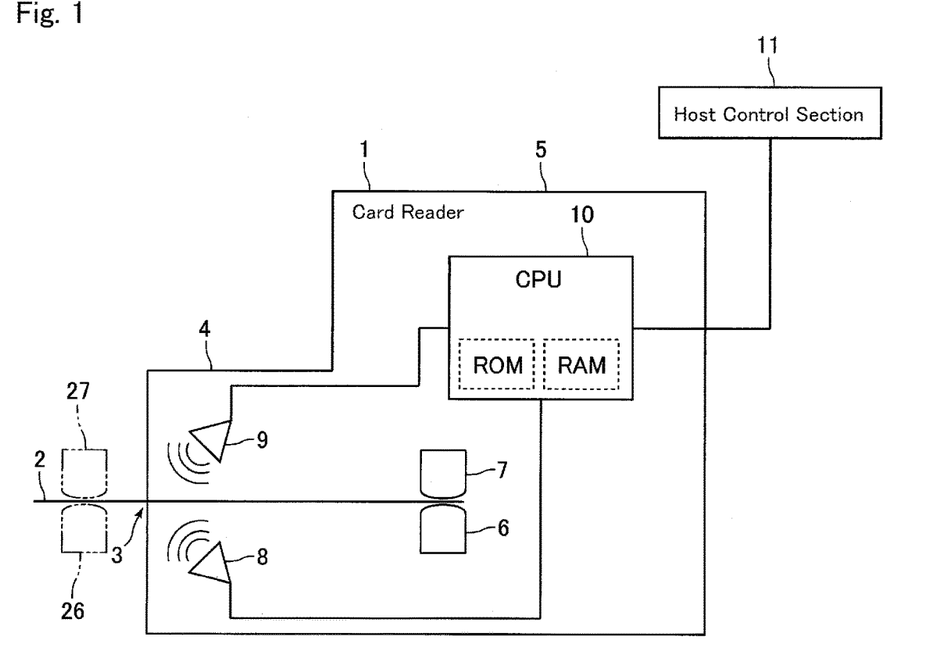
FIG. 1 is an explanatory view showing a schematic structure of a card reader in accordance with a first embodiment of the present invention.
Figure 2:
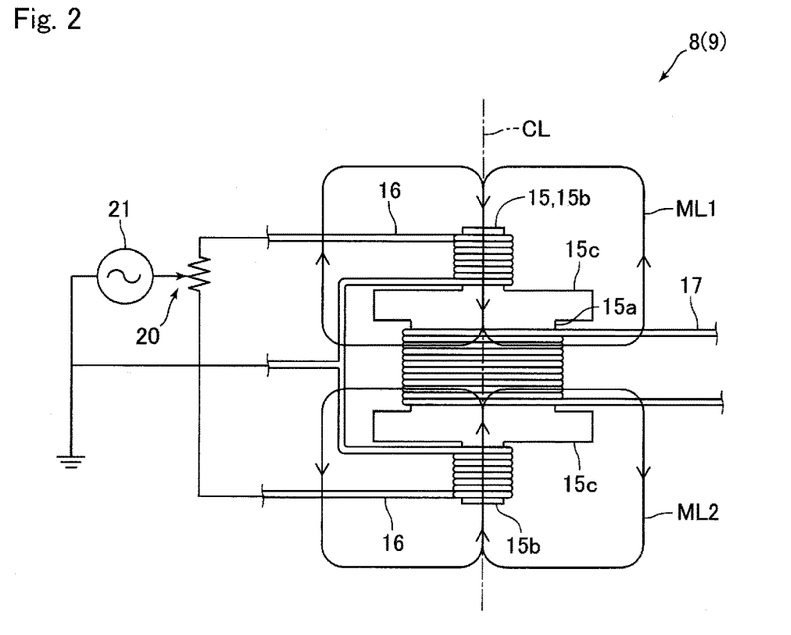
FIG. 2 is an explanatory view showing a structure of a metal sensor shown in FIG. 1.

FIG. 1 is an explanatory view showing a schematic structure of a card reader 1 in accordance with a first embodiment of the present invention. FIG. 2 is an explanatory view showing a structure of metal sensors 8 and 9 shown in FIG. 1.

A card reader 1 in this embodiment is a device structured to perform reading of magnetic data recorded in a card 2 and/or recording of magnetic data to a card 2 and is, for example, mounted and used in a predetermined host apparatus such as an ATM. The card reader 1 includes, as shown in FIG. 1, a card insertion part 4 formed with an insertion port 3 into which a card 2 is inserted and a main body part 5. The card insertion part 4 is attached to a front end face of the main body part 5. A card conveying passage where a card 2 is conveyed is formed in an inside of the card reader 1.

Further, the card reader 1 includes a card conveying mechanism (not shown) structured to convey a card 2, two magnetic heads 6 and 7 configured to perform at least one of reading of magnetic data and recording of magnetic data, two metal sensors 8 and 9 configured to detect a foreign matter including metal material which is attached near the card insertion part 4, and a control section 10 connected with the two metal sensors 8 and 9. The control section 10 is, for example, a CPU which includes a ROM and a RAM. The control section 10 is connected with a control section (host control section) 11 of a host apparatus on which the card reader 1 is mounted.

A card 2 is, for example, a rectangular card made of vinyl chloride whose thickness is about 0.7-0.8 mm A front face and a rear face of the card 2 (in other words, both faces of the card 2) are formed with a magnetic stripe in which magnetic data are recorded. An IC chip may be incorporated in the card 2. Further, the card 2 may be a PET (polyethylene terephthalate) card whose thickness is about 0.18-0.36 mm and may be a paper card having a predetermined thickness.

The magnetic heads 6 and 7 are disposed in an inside of the main body part 5. The magnetic head 6 is disposed so that its gap part faces the card conveying passage from a lower side so as to be capable of abutting with a magnetic stripe formed on a rear face of the card 2. The magnetic head 7 is disposed so that its gap part faces the card conveying passage from an upper side so as to be capable of abutting with a magnetic stripe formed on a front face of the card 2.

The metal sensors 8 and 9 are disposed in an inside of the card insertion part 4 which is formed in a hollow shape. In this embodiment, the metal sensor 8 is disposed on a lower side with respect to the card conveying passage and the metal sensor 9 is disposed on an upper side with respect to the card conveying passage. Further, the metal sensor 8 and the metal sensor 9 are disposed at substantially the same position in a width direction (short width direction, direction perpendicular to a paper face of FIG. 1) of a card 2 perpendicular to a conveying direction of the card 2 (right and left direction in FIG. 1) and a thickness direction of the card 2 (upper and lower direction in FIG. 1). In this embodiment, a distance between the metal sensor 8 and the metal sensor 9 is close or short. However, a distance between the metal sensor 8 and the metal sensor 9 is set in a distance such that the metal sensor 8 does not detect the metal sensor 9 as a metal and the metal sensor 9 does not detect the metal sensor 8 as a metal. Further, the metal sensors 8 and 9 includes, as shown in FIG. 2, a core 15 formed of magnetic material and a pair of excitation coils 16 and a detection coil 17 which are wound around with a center axis "CL" of the core 15 as a center.

The core 15 is formed in a thin plate shape whose thickness direction is a direction perpendicular to a paper face of FIG. 2. The core 15 is structured of a center core part 15a disposed at a substantially center in an axial direction of the center axis "CL", a pair of axially end core parts 15b disposed on both end sides of the center core part 15a in the axial direction of the center axis "CL", and width enlarged parts 15c disposed between the center core part 15a and the axially end core parts 15b. A width of the center core part 15a is set to be wider than a width of the axially end core part 15b. Further, a width of the width enlarged part 15c is set to be wider than a width of the center core part 15a.

A pair of the excitation coils 16 is wound around a pair of the axially end core parts 15b respectively. The detection coil 17 is wound around the center core part 15a. In other words, the detection coil 17 is wound around the core 15 between a pair of the excitation coils 16 in the axial direction of the center axis "CL". One end part of the excitation coil 16 is electrically connected with a variable resistor 20. The variable resistor 20 is electrically connected with an AC power source 21. The other end part of the excitation coil 16 is grounded. In this embodiment, when a current supply signal is outputted from the control section 10, power is supplied to the excitation coils 16 from the AC power source 21. In other words, the control section 10 outputs a current supply signal and supplies a current to the excitation coils 16. Both end parts of the detection coil 17 are electrically connected with a voltage detection circuit which structures a part of the control section 10.

The metal sensors 8 and 9 detect a variation of a magnetic field generated from the excitation coils 16 by the detection coil 17 and perform a function for detecting that a foreign matter including metal material has been attached near the card insertion part 4. Specifically, the metal sensor 8 mainly perform a function for detecting a foreign matter including metal material such as a skimming magnetic head 26 has been attached on a front face side of the card insertion part 4 and on a lower side with respect to the card conveying passage. The metal sensor 9 mainly perform a function for detecting a foreign matter including metal material such as a skimming magnetic head 27 has been attached on a front face side of the card insertion part 4 and on an upper side with respect to the card conveying passage.

Therefore, the metal sensor 8 is disposed so that magnetic lines of force "ML1" indicating a magnetic field generated by one of the excitation coils 16 of the metal sensor 8 or magnetic lines of force "ML2" indicating a magnetic field generated by the other of the excitation coils 16 pass a position where a foreign matter such as a skimming magnetic head 26 is assumed to be attached. Further, the metal sensor 9 is disposed so that magnetic lines of force "ML1" indicating a magnetic field generated by one of the excitation coils 16 of the metal sensor 9 or magnetic lines of force "ML2" indicating a magnetic field generated by the other of the excitation coils 16 pass a position where a foreign matter such as a skimming magnetic head 27 is assumed to be attached.

A pair of the excitation coils 16 is excited so that the density of magnetic lines of force "ML1" and the density of magnetic lines of force "ML2" are balanced with each other and so that the direction of the magnetic lines of force "ML1" and the direction of the magnetic lines of force "ML2" are reversed when there is no foreign matter including metal material such as skimming magnetic heads 26 and 27 in detectable regions of the metal sensors 8 and 9. In other words, the variable resistor 20 is adjusted so that a magnetic field generated by the one of the excitation coils 16 and a magnetic field generated by the other of the excitation coils 16 are balanced with each other when there is no foreign matter such as skimming magnetic heads 26 and 27 in detectable regions of the metal sensors 8 and 9. In other words, the variable resistor 20 is adjusted so that a voltage is not generated between both end parts of the detection coil 17 when there is no foreign matter such as skimming magnetic heads 26 and 27 in detectable regions of the metal sensors 8 and 9. Therefore, when a foreign matter such as skimming magnetic heads 26 and 27 is attached in a detectable regions of the metal sensors 8 and 9, balance between a magnetic field generated by the one of the excitation coils 16 and a magnetic field generated by the other of the excitation coils 16 is changed to generate a voltage between both end parts of the detection coil 17.

In this embodiment, it is detected that a foreign matter including metal material such as skimming magnetic heads 26 and 27 has been attached near the card insertion part 4 based on a value of a voltage (voltage value) generated between both end parts of the detection coil 17. In other words, in this embodiment, it is detected that a foreign matter such as skimming magnetic heads 26 and 27 has been attached near the card insertion part 4 based on output values of the metal sensors 8 and 9.

In the following descriptions, the metal sensor 8 is referred to as a "first metal sensor 8" and the metal sensor 9 is referred to as a "second metal sensor 9". Further, in the following descriptions, when the excitation coil 16 of the first metal sensor 8 and the excitation coil 16 of the second metal sensor 9 are distinguishably described, the excitation coil 16 of the first metal sensor 8 is referred to as a "first excitation coil 16A", and the excitation coil 16 of the second metal sensor 9 is referred to as a "second excitation coil 16B". Further, when the detection coil 17 of the first metal sensor 8 and the detection coil 17 of the second metal sensor 9 are distinguishably described, the detection coil 17 of the first metal sensor 8 is referred to as a "first detection coil 17A" and the detection coil 17 of the second metal sensor 9 is referred to as a "second detection coil 17B".

(Control Method for Card Reader in Foreign Matter Detection Processing)

Figure 3:
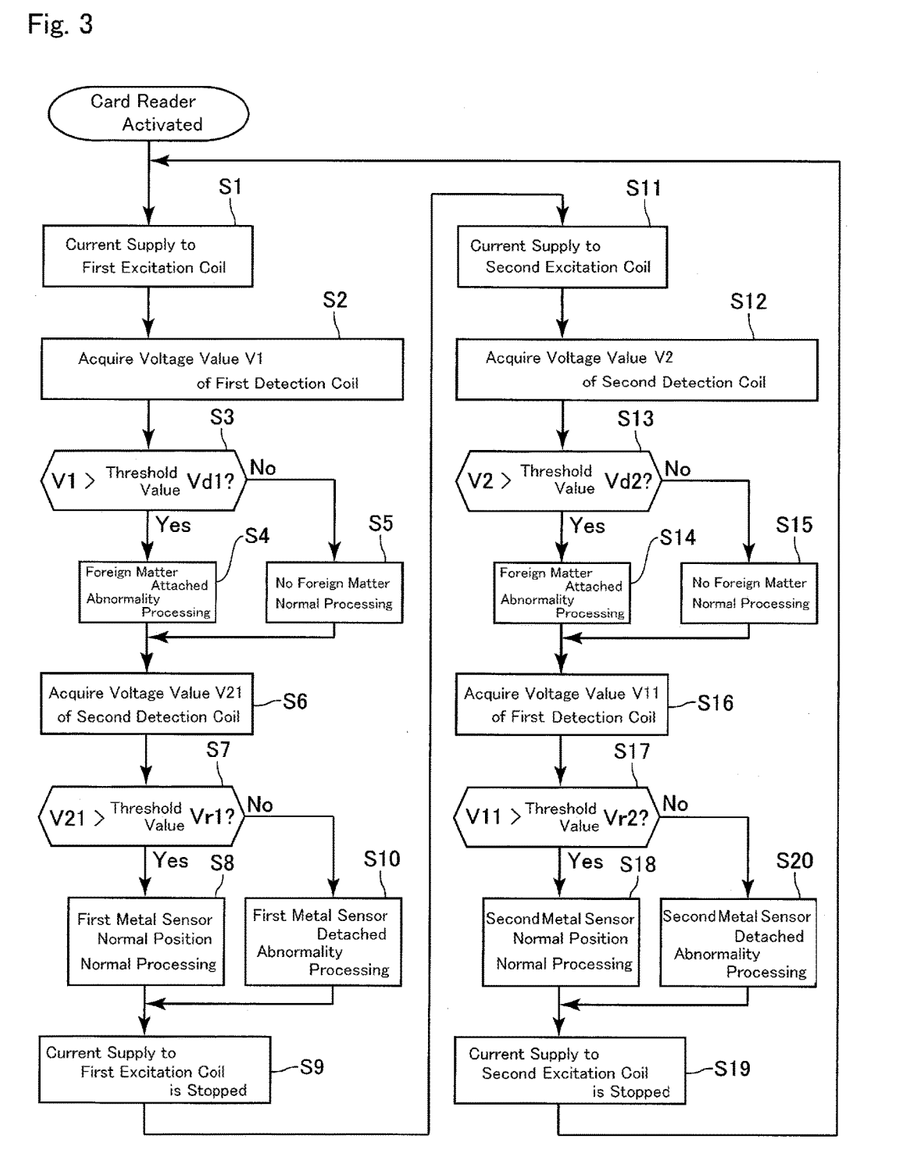
FIG. 3 is a flow chart showing an example of a control flow for a first metal sensor and a second metal sensor when foreign matter detection processing is performed in a card reader shown in FIG. 1.

FIG. 3 is a flow chart showing an example of a control flow for the first metal sensor 8 and the second metal sensor 9 when foreign matter detection processing is performed in the card reader 1 shown in FIG. 1.

In the card reader 1 in this embodiment, when a power supply of the card reader 1 is supplied and the card reader 1 is activated, the control section 10 first outputs a current supply signal to the first excitation coil 16A and supplies a current to the first excitation coil 16A (step S1). In the step S1, the control section 10 does not supply a current to the second excitation coil 16B. After that, the control section 10 acquires a voltage value "V1" between both end parts of the first detection coil 17A (step S2). In other words, in the step S2, the control section 10 acquires an output value of the first metal sensor 8.

After that, the control section 10 judges whether the voltage value "V1" is larger than a predetermined threshold value "Vd1" or not (step S3). In the step S3, when the voltage value "V1" is larger than the threshold value "Vd1", the control section 10 determines that a foreign matter including metal material such as skimming magnetic heads 26 and 27 has been attached near the card insertion part 4 and performs a predetermined abnormality processing (step S4). On the other hand, in the step S3, when the voltage value "V1" is not more than the threshold value "Vd1", the control section 10 determines that a foreign matter including metal material is not attached near the card insertion part 4 and performs a predetermined normal processing (step S5).

As described above, in this embodiment, since a distance between the first metal sensor 8 and the second metal sensor 9 is close, even when a current is not supplied to the second excitation coil 16B, a voltage should be generated between both end parts of the second detection coil 17B due to influence of the magnetic field generated by the first excitation coil 16A. When the step S4 or S5 is finished, the control section 10 acquires a voltage value "V21" between both end parts of the second detection coil 17B (step S6). In other words, in the step S6, the control section 10 acquires an output value of the second detection coil 17B. Further, the control section 10 judges whether the voltage value "V21" is larger than a predetermined threshold value "Vr1" or not (step S7).

In the step S7, when the voltage value "V21" is larger than the threshold value "Vr1", the control section 10 determines that a distance between the first metal sensor 8 and the second metal sensor 9 is an appropriate distance and that the first metal sensor 8 is disposed at a normal position and, after performing a predetermined normal processing (step S8), the control section 10 stops supply of the current to the first excitation coil 16A (step S9). On the other hand, in the step S7, when the voltage value "V21" is not more than the threshold value "Vr1", the control section 10 determines that the first metal sensor 8 is disposed at an apart position from the second metal sensor 9 and that the first metal sensor 8 is not disposed at a normal position (in other words, determines that the first metal sensor 8 has been detached) and, after performing a predetermined abnormality processing (step S10), the control section 10 performs the step S9.

After that, the control section 10 outputs a current supply signal to the second excitation coil 16B and supplies a current to the second excitation coil 16B (step S11). After that, the control section 10 acquires a voltage value "V2" between both end parts of the second detection coil 17B (step S12). In other words, in the step S12, the control section 10 acquires an output value of the second metal sensor 9. After that, the control section 10 judges whether the voltage value "V2" is larger than a predetermined threshold value "Vd2" or not (step S13).

In the step S13, when the voltage value "V2" is larger than the threshold value "Vd2", the control section 10 determines that a foreign matter including metal material such as skimming magnetic heads 26 and 27 has been attached near the card insertion part 4 and performs a predetermined abnormality processing (step S14). On the other hand, in the step S13, when the voltage value "V2" is not more than the threshold value "Vd2", the control section 10 determines that a foreign matter including metal material is not attached near the card insertion part 4 and performs a predetermined normal processing (step S15).

As described above, in this embodiment, since a distance between the first metal sensor 8 and the second metal sensor 9 is close, even when a current is not supplied to the first excitation coil 16A, a voltage should be generated between both end parts of the first detection coil 17A due to influence of the magnetic field generated by the second excitation coil 16B. When the step S14 or S15 is finished, the control section 10 acquires a voltage value "V11" between both end parts of the first detection coil 17A (step S16). In other words, in the step S16, the control section 10 acquires an output value of the first detection coil 17A. Further, the control section 10 judges whether the voltage value "V11" is larger than a predetermined threshold value "Vr2" or not (step S17).

In the step S17, when the voltage value "V11" is larger than the threshold value "Vr2", the control section 10 determines that a distance between the first metal sensor 8 and the second metal sensor 9 is an appropriate distance and that the second metal sensor 9 is disposed at a normal position and, after performing a predetermined normal processing (step S18), the control section 10 stops supply of the current to the second excitation coil 16B (step S19). On the other hand, in the step S17, when the voltage value "V11" is not more than the threshold value "Vr2", the control section 10 determines that the second metal sensor 8 is disposed at an apart position from the first metal sensor 9 and that the second metal sensor 9 is not disposed at a normal position and, after performing a predetermined abnormality processing (step S20), the control section 10 performs the step S19. Further, in the step S19, when supply of the current to the second excitation coil 16B is stopped, the flow is returned to the step S1.

As described above, in this embodiment, the control section 10 alternately supplies a current to the first excitation coil 16A and the second excitation coil 16B. In other words, the control section 10 supplies a current to two pieces of the first excitation coil 16A and the second excitation coil 16B at different timings. Further, in this embodiment, in the steps S6 and S7, the control section 10 determines whether the first metal sensor 8 is disposed at a normal position or not based on an output value of the second detection coil 17B when a current is supplied to the first excitation coil 16A and, in the steps S16 and S17, the control section 10 determines whether the second metal sensor 9 is disposed at a normal position or not based on an output value of the first detection coil 17A when a current is supplied to the second excitation coil 16B.

In this embodiment, the threshold values "Vd1" and "Vd2" are capable of being set individually. The threshold values "Vd1" and "Vd2" are, for example, set as follows in consideration of an attaching position, material and a size of an assumed foreign matter such as skimming magnetic heads 26 and 27;

"Vd1"=1150 (mV), "Vd2"=1110 (mV)

Further, in this embodiment, the threshold values "Vr1" and "Vr2" are capable of being set individually. The threshold values "Vr1" and "Vr2" are, for example, set as follows in consideration of, in a state that the first metal sensor 8 and the second metal sensor 9 are disposed at normal positions, a voltage generated between both end parts of the second detection coil 17B when a current is supplied only to the first excitation coil 16A and a voltage generated between both end parts of the first detection coil 17A when a current is supplied only to the second excitation coil 16B;

"Vr1"=500 (mV), "Vr2"=450 (mV)

Principal Effects in this Embodiment

As described above, in this embodiment, a current is alternately supplied to the first excitation coil 16A and the second excitation coil 16B. Therefore, according to this embodiment, when the first metal sensor 8 detects whether a foreign matter including metal material has been attached to the card insertion part 4 or not, the voltage value "V1" of the first detection coil 17A is not affected by a magnetic field generated from the second excitation coil 16B. Further, when the second metal sensor 9 detects whether a foreign matter including metal material has been attached to the card insertion part 4 or not, the voltage value "V2" of the second detection coil 17B is not affected by a magnetic field generated from the first excitation coil 16A.

Therefore, according to this embodiment, it can be appropriately detected by the first metal sensor 8 whether a foreign matter including metal material has been attached to the card insertion part 4 or not based on a variation of the magnetic field generated by the first excitation coil 16A, and it can be appropriately detected by the second metal sensor 9 whether a foreign matter including metal material has been attached to the card insertion part 4 or not based on a variation of the magnetic field generated by the second excitation coil 16B. As a result, in this embodiment, the card reader 1 includes two metal sensors 8 and 9, i.e., the first metal sensor 8 and the second metal sensor 9 for detecting that a foreign matter including metal material such as skimming magnetic heads 26 and 27 has been attached to the card insertion part 4 and, in addition, even when a distance between the first metal sensor 8 and the second metal sensor 9 is close, erroneous detection that a foreign matter including metal material has been attached to the card insertion part 4 can be prevented.

In this embodiment, the control section 10 determines in the steps S6 and S7 whether the first metal sensor 8 is disposed at a normal position or not based on an output value of the second detection coil 17B when a current is supplied to the first excitation coil 16A and, in the steps S16 and S17, the control section 10 determines whether the second metal sensor 9 is disposed at a normal position or not based on an output value of the first detection coil 17A when a current is supplied to the second excitation coil 16B. Therefore, according to this embodiment, even when a structure is not separately provided for detecting that the first metal sensor 8 and the second metal sensor 9 are not illegally detached, it can be detected that the second metal sensor 9 is not illegally detached based on an output value of the first detection coil 17A, and it can be detected that the first metal sensor 8 is not illegally detached based on an output value of the second detection coil 17B. Accordingly, in this embodiment, a structure of the card reader 1 can be simplified.

Second Embodiment

Figure 4:
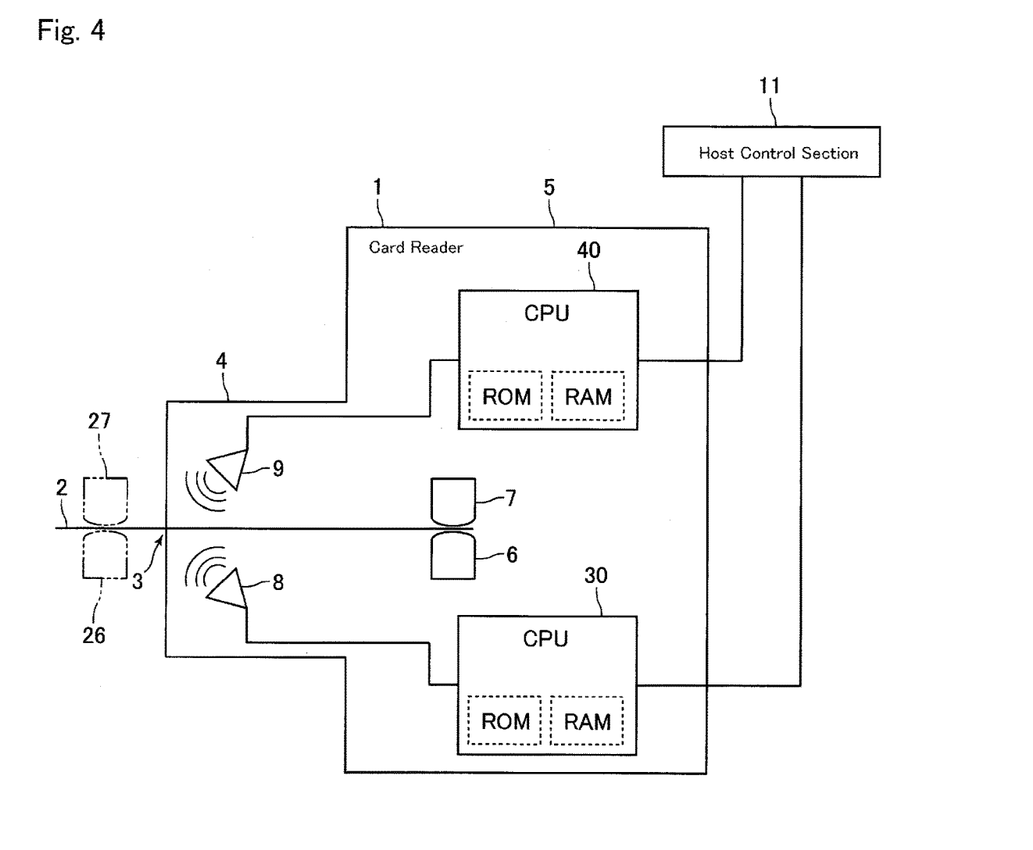
FIG. 4 is an explanatory view showing a schematic structure of a card reader in accordance with a second embodiment of the present invention.
Figure 5:
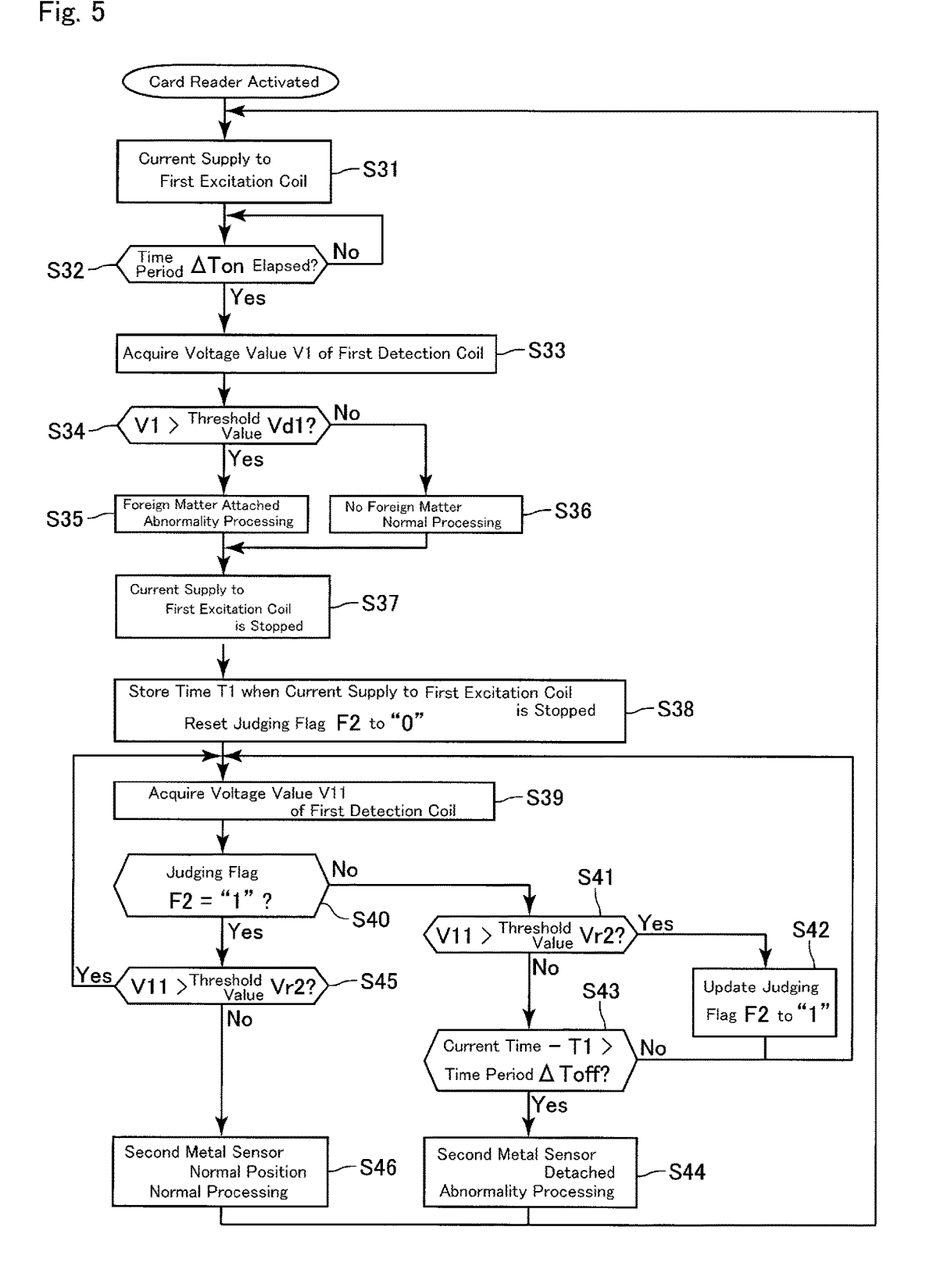
FIG. 5 is a flow chart showing an example of a control flow for a first metal sensor when foreign matter detection processing is performed in a card reader shown in FIG. 4.
Figure 6:
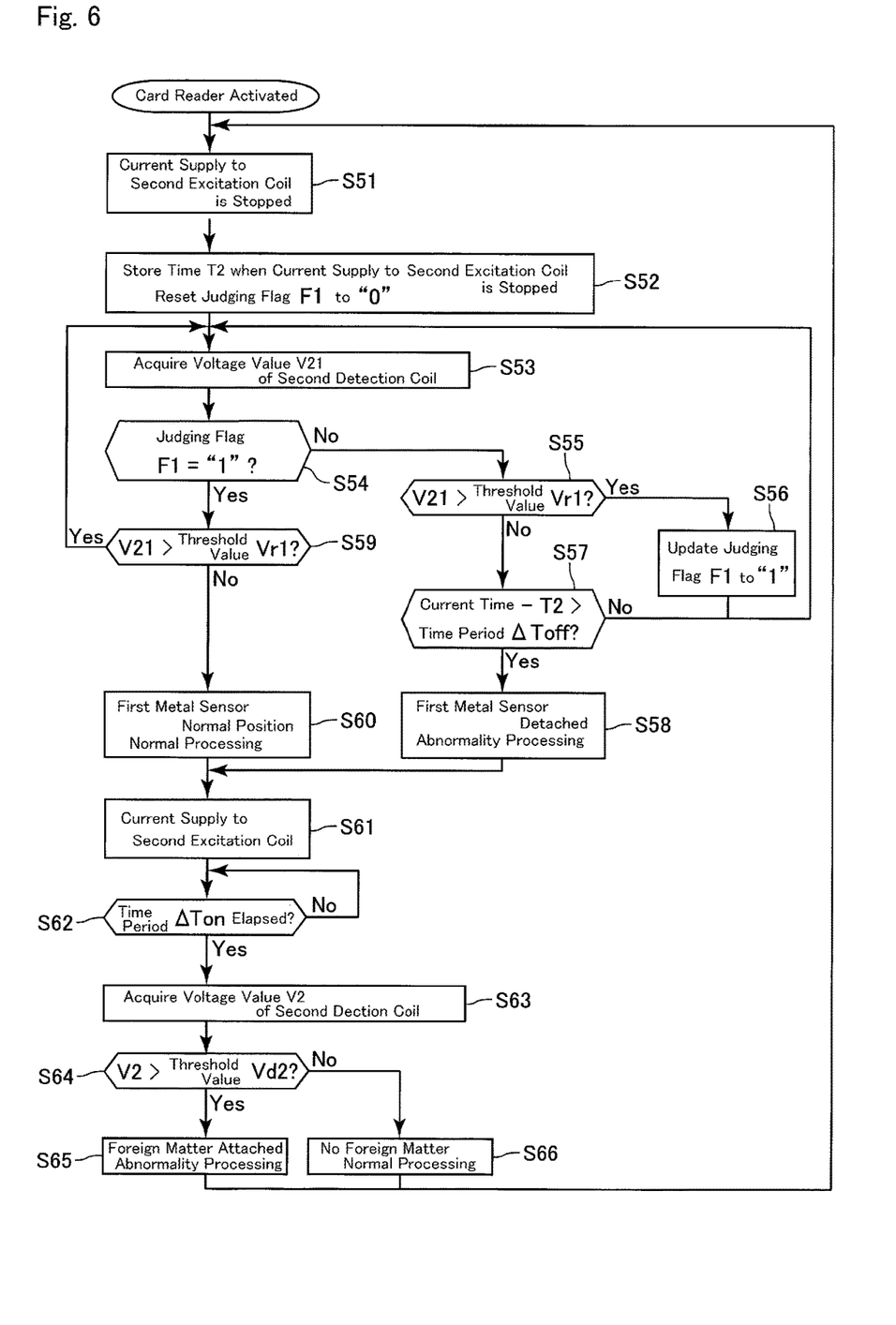
FIG. 6 is a flow chart showing an example of a control flow for a second metal sensor when foreign matter detection processing is performed in a card reader 1 shown in FIG. 4.

FIG. 4 is an explanatory view showing a schematic structure of a card reader 1 in accordance with a second embodiment of the present invention. FIG. 5 is a flow chart showing an example of a control flow for a first metal sensor 8 when foreign matter detection processing is performed in the card reader 1 shown in FIG. 4. FIG. 6 is a flow chart showing an example of a control flow for a second metal sensor 9 when foreign matter detection processing is performed in the card reader 1 shown in FIG. 4.

In the first embodiment, the first metal sensor 8 and the second metal sensor 9 are connected with the common control section 10. On the other hand, in the second embodiment, the first metal sensor 8 and the second metal sensor 9 are respectively connected with different control sections 30 and 40. Further, since the first metal sensor 8 and the second metal sensor 9 are respectively connected with different control sections 30 and 40, control methods for the first metal sensor 8 and the second metal sensor 9 in the second embodiment are different from the first embodiment when foreign matter detection processing is performed. Next, a card reader 1 in accordance with the second embodiment will be described below regarding especially the difference. In FIG. 4, the same reference signs are used in common structures to the first embodiment. Further, in the second embodiment, the description of the structure common to the first embodiment will be omitted or simplified.

As described above, in this embodiment, the first metal sensor 8 and the second metal sensor 9 are respectively connected with different control sections 30 and 40. In other words, the card reader 1 in this embodiment includes two control sections 30 and 40 which are respectively connected with two pieces of the first metal sensor 8 and the second metal sensor 9. Similarly to the control section 10, the control sections 30 and 40 are, for example, CPUs which include a ROM and a RAM. Further, the control sections 30 and 40 are connected with a host control section 11.

The first metal sensor 8 is connected with the control section 30 and the second metal sensor 9 is connected with the control section 40. In other words, the control section 30 outputs a current supply signal to the first excitation coil 16A and supplies a current to the first excitation coil 16A, and the control section 40 outputs a current supply signal to the second excitation coil 16B and supplies a current to the second excitation coil 16B. Further, both end parts of the first detection coil 17A is electrically connected with a voltage detection circuit structuring a part of the control section 30 and both end parts of the second detection coil 17B is electrically connected with a voltage detection circuit structuring a part of the control section 40. In the following descriptions, the control section 30 is referred to as a "first control section 30" and the control section 40 is referred to as a "second control section 40".

In this embodiment, a time period that a current is supplied to the first excitation coil 16A and a time period that a current is supplied to the second excitation coil 16B are set to be equal to each other. Further, in this embodiment, the maximum time period that supply of a current to the first excitation coil 16A is stopped and the maximum time period that supply of a current to the second excitation coil 16B is stopped are set to be equal to each other. In the following descriptions, the time period that a current is supplied to the first excitation coil 16A and the second excitation coil 16B is referred to as a time period "ΔTon", and the maximum time period that supply of a current to the first excitation coil 16A and the second excitation coil 16B is stopped is referred to as a "ΔToff".

In the card reader 1 in this embodiment, when a power supply of the card reader 1 is supplied and the card reader 1 is activated, as shown in FIG. 5, the first control section 30 first outputs a current supply signal to the first excitation coil 16A and supplies a current to the first excitation coil 16A (step S31). On the other hand, as shown in FIG. 6, even when the card reader 1 is activated, the second control section 40 is in a state that supply of a current to the second excitation coil 16B is stopped (step S51). After that, the first control section 30 judges whether the time period "ΔTon" has elapsed or not after the supply of a current to the first excitation coil 16A is started (step S32) and, when the time period "ΔTon" has elapsed, the first control section 30 acquires a voltage value "V1" between both end parts of the first detection coil 17A (step S33). In other words, in the step S33, the first control section 30 acquires an output value of the first metal sensor 8.

After that, the first control section 30 judges whether the voltage value "V1" is larger than a predetermined threshold value "Vd1" or not (step S34). In the step S34, when the voltage value "V1" is larger than the threshold value "Vd1", the first control section 30 determines that a foreign matter including metal material such as skimming magnetic heads 26 and 27 has been attached near the card insertion part 4 and performs a predetermined abnormality processing (step S35). On the other hand, in the step S34, when the voltage value "V1" is not more than the threshold value "Vd1", the first control section 30 determines that a foreign matter including metal material is not attached near the card insertion part 4 and performs a predetermined normal processing (step S36).

After that, the first control section 30 stops supply of the current to the first excitation coil 16A (step S37). After that, the first control section 30 stores a time "T1" when the supply of a current to the first excitation coil 16A is stopped (step S38). Further, in the step S38, a judging flag "F2" for judging whether the first control section 30 acquires a voltage value "V11" of the first detection coil 17A larger than the threshold value "Vr2" or not is reset in "0" at this time when the supply of a current to the first excitation coil 16A is stopped. When the judging flag "F2" is "0", the first control section 30 does not acquire the voltage value "V11" larger than the threshold value "Vr2" when the supply of a current to the first excitation coil 16A is stopped this time and, when the judging flag "F2" is "1", the first control section 30 has already acquired the voltage value "V11" larger than the threshold value "Vr2" when the supply of the current to the first excitation coil 16A is stopped this time.

After that, the first control section 30 acquires a voltage value "V11" between both end parts of the first detection coil 17A (step S39). In other words, in the step S39, the first control section 30 acquires an output value of the first detection coil 17A. After that, the first control section 30 judges whether the judging flag "F2" is "0" or "1" (step S40). In the step S40, in a case that the judging flag "F2" is "0", the first control section 30 judges whether the voltage value "V11" is larger than the threshold value "Vr2" or not (step S41).

In the step S41, when the voltage value "V11" is larger than the threshold value "Vr2", the first control section 30 updates the judging flag "F2" to "1" (step S42) and then returns to the step S39. In the case that it is judged that the voltage value "V11" is larger than the threshold value "Vr2" in the step S41, a current is supplied to the second excitation coil 16B and a distance between the first metal sensor 8 and the second metal sensor 9 is an appropriate distance and the second metal sensor 9 is disposed at a normal position.

On the other hand, in a case that the voltage value "V11" is not more than the threshold value "Vr2" in the step S41, the first control section 30 judges whether a difference between the time "T1" stored in the step S38 and a current time exceeds the time period "ΔToff" or not (step S43). In a case that the difference between the current time and the time "T1" does not exceed the time period "ΔToff" in the step S43, the first control section 30 judges that supply of the current to the second excitation coil 16B may not be started when the voltage value "V11" is acquired in the step S39 and returns to the step S39.

Further, in the step S43, in a case that a difference between the current time and the time "T1" exceeds the time period "ΔToff", the first control section 30 determines that the second metal sensor 9 is disposed in an apart distance from the first metal sensor 8 and that the second metal sensor 9 is not disposed at a normal position (in other words, determines that the second metal sensor 9 is detached) and, after executing a predetermined abnormality processing (step S44), the first control section 30 returns to the step S31.

Further, in the step S40, when the judging flag "F2" is "1", the first control section 30 judges whether the voltage value "V11" is larger than the threshold value "Vr2" or not (step S45). In the step S45, in a case that the voltage value "V11" is not more than the threshold value "Vr2", the first control section 30 determines that supply of the current to the second excitation coil 16B is stopped and determines that a distance between the first metal sensor 8 and the second metal sensor 9 is an appropriate distance and the second metal sensor 9 is disposed at a normal position and, after executing a predetermined normal processing (step S46), the first control section 30 returns to the step S31.

On the other hand, in the step S45, in a case that the voltage value "V11" is larger than the threshold value "Vr2", the flow is returned to the step S39, and the steps S39, S40 and S45 are repeated until the supply of the current to the second excitation coil 16B is stopped and the voltage value "V11" becomes not more than the threshold value "Vr2". In other words, in this embodiment, after it is detected that the voltage value "V11" is larger than the threshold value "Vr2" for determining whether the second metal sensor 9 is disposed at a normal position or not, it is detected that the voltage value "V11" becomes not more than the threshold value "Vr2" and thereby it is indirectly detected that supply of a current to the second excitation coil 16B is stopped.

As described above, even when the card reader 1 is activated, the second control section 40 is in a state that supply of a current to the second excitation coil 16B is stopped (step S51). After that, the second control section 40 stores a time "T2" when supply of a current to the second excitation coil 16B is stopped (step S52). In the step S51 just after the card reader 1 is activated, supply of a current to the second excitation coil 16B is stopped and thus, the second control section 40 stores a time when the card reader 1 is activated as the time "T2" in the step S52 just after the card reader 1 is activated.

Further, in the step S52, a judging flag "F1" for judging whether the second control section 40 acquires a voltage value "V21" of the second detection coil 17B larger than the threshold value "Vr1" or not at this time when supply of a current to the second excitation coil 16B is stopped is reset to "0". In a case that the judging flag "F1" is "0", the second control section 40 does not acquire a voltage value "V21" which is larger than the threshold value "Vr1" when supply of a current to the second excitation coil 16B is stopped this time and, when the judging flag "F1" is "1", the second control section 40 has already acquired a voltage value "V21" larger than the threshold value "Vr1" when supply of the current to the second excitation coil 16B is stopped this time.

After that, the second control section 40 acquires a voltage value "V21" between both end parts of the second detection coil 17B (step S53). In other words, in the step S53, the second control section 40 acquire an output value of the second detection coil 17B. After that, the second control section 40 judges whether the judging flag "F1" is "0" or "1" (step S54). In the step S54, when the judging flag "F1" is "0", the second control section 40 judges whether the voltage value "V21" is larger than the threshold value "Vr1" or not (step S55).

In the step S55, when the voltage value "V21" is larger than the threshold value "Vr1", the second control section 40 updates the judging flag "F1" to "1" (step S56) and then returns to the step S53. In the step S55, in a case that it is judged that the voltage value "V21" is larger than the threshold value "Vr1", a current is supplied to the first excitation coil 16A and a distance between the first metal sensor 8 and the second metal sensor 9 is an appropriate distance, and the first metal sensor 8 is disposed at a normal position.

On the other hand, in the step S55, in a case that the voltage value "V21" is not more than the threshold value "Vr1", the second control section 40 judges whether a difference between the time "T2" stored in the step S52 and a current time exceeds the time period "ΔToff" or not (step S57). In the step S57, in a case that the difference between the current time and the time "T2" does not exceed the time period "ΔToff", the second control section 40 judges that supply of a current to the first excitation coil 16A may not be started when the voltage value "V21" is acquired in the step S53 and returns to the step S53.

Further, in the step S57, in a case that a difference between the current time and the time "T2" exceeds the time period "ΔToff", the second control section 40 determines that the first metal sensor 8 is disposed in an apart distance from the second metal sensor 9 and that the first metal sensor 8 is not disposed at a normal position (in other words, determines that the first metal sensor 9 is detached) and a predetermined abnormality processing is executed (step S58).

Further, in the step S54, in a case that the judging flag "F1" is "1", the second control section 40 judges whether the voltage value "V21" is larger than the threshold value "Vr1" or not (step S59). In the step S59, in a case that the voltage value "V21" is not more than the threshold value "Vr1", the second control section 40 determines that supply of the current to the first excitation coil 16A is stopped and determines that a distance between the first metal sensor 8 and the second metal sensor 9 is an appropriate distance and the first metal sensor 8 is disposed at a normal position and a predetermined normal processing is executed (step S60).

On the other hand, in the step S59, in a case that the voltage value "V21" is larger than the threshold value "Vr1", the flow is returned to the step S53, and the steps S53, S54 and S59 are repeated until the supply of the current to the first excitation coil 16A is stopped and the voltage value "V21" becomes not more than the threshold value "Vr1". In other words, in this embodiment, after it is detected that the voltage value "V21" is larger than the threshold value "Vr1" for determining whether the first metal sensor 8 is disposed at a normal position or not, it is detected that the voltage value "V21" becomes not more than the threshold value "Vr1" and thereby it is indirectly detected that supply of the current to the first excitation coil 16A is stopped.

When the step S58 or S60 is finished, the second control section 40 outputs a current supply signal to the second excitation coil 16B and a current is supplied to the second excitation coil 16B (step S61). After that, the second control section 40 judges whether the time period "ΔTon" has elapsed or not after supply of the current to the second excitation coil 16B is started (step S62) and, when the time period "ΔTon" has elapsed, a voltage value "V2" between both end parts of the second detection coil 17B is acquired (step S63). In other words, in the step S63, the second control section 40 acquires an output value of the second metal sensor 9.

After that, the second control section 40 judges whether the voltage value "V2" is larger than the predetermined threshold value "Vd2" or not (step S64). In the step S64, in a case that the voltage value "V2" is larger than the threshold value "Vd2", the second control section 40 determines that a foreign matter including metal material such as skimming magnetic heads 26 and 27 has been attached near the card insertion part 4 and, after performing a predetermined abnormality processing (step S65), the flow is returned to the step S51. On the other hand, in the step S64, when the voltage value "V2" is not more than the threshold value "Vd2", the second control section 40 determines that a foreign matter including metal material is not attached near the card insertion part 4 and, after performing a predetermined normal processing (step S66), the flow is returned to the step S51.

In the step S51 after the step S65 or the step S66 has been performed, the second control section 40 stops supply of a current to the second excitation coil 16B. Further, in the step S52 after the step S65 or the step S66 has been performed, the second control section 40 stores a time "T2" when supply of the current to the second excitation coil 16B is stopped in the step S51.

As described above, in this embodiment, the first control section 30 determines whether supply of a current to the second excitation coil 16B is stopped or not based on an output value of the first detection coil 17A (in other words, voltage value "V11") in a state that supply of a current to the first excitation coil 16A is stopped in the step S45 after supply of a current to the first excitation coil 16A is stopped in the step S37. Further, the voltage value "V11" becomes not more than the threshold value "Vr2" and, when the first control section 30 determines that supply of a current to the second excitation coil 16B is stopped, the first control section 30 returns to the step S31 and starts supply of a current to the first excitation coil 16A.

Further, the second control section 40 determines whether supply of a current to the first excitation coil 16A is stopped or not based on an output value of the second detection coil 17B (in other words, voltage value "V21") in a state that supply of a current to the second excitation coil 16B is stopped in the step S59 after supply of a current to the second excitation coil 16B is stopped in the step S51. Further, the voltage value "V21" becomes not more than the threshold value "Vr1" and, when the second control section 40 determines that supply of a current to the first excitation coil 16A is stopped, the second control section 40 advances to the step S61 and starts supply of a current to the second excitation coil 16A.

In other words, in this embodiment, the first control section 30 and the second control section 40 alternately supply a current to the first excitation coil 16A and the second excitation coil 16B. In other words, the first control section 30 and the second control section 40 supply a current to two pieces of the first excitation coil 16A and the second excitation coil 16B at different timings. Further, in this embodiment, the first control section 30 determines whether the second metal sensor 9 is disposed at a normal position or not based on an output value of the first detection coil 17A when a current is supplied to the second excitation coil 16B in the steps S39 through S43, and the second control section 40 determines whether the first metal sensor 8 is disposed at a normal position or not based on an output value of the second detection coil 17B when a current is supplied to the first excitation coil 16A in the steps S53 through S57.

In this embodiment, the "ΔTon" and the "ΔToff" are, for example, set as follows so that a current is alternately supplied to the first excitation coil 16A and the second excitation coil 16B;

"ΔTon"=25 (msec), "ΔToff"=100 (msec)

Further, in this embodiment, in a case that the first metal sensor 8, the second metal sensor 9, the first control section 30 and the second control section 40 are normally operated, a current flowing through the first excitation coil 16A and a current flowing through the second excitation coil 16B are switched every 25 (msec). In this case, it is preferable that the "ΔToff" is set to be longer than the "ΔTon".

Also in this embodiment, similar effects to the first embodiment can be obtained. In other words, in this embodiment, a current is alternately supplied to the first excitation coil 16A and the second excitation coil 16B. Therefore, even when the card reader 1 includes two metal sensors 8 and 9, i.e., the first metal sensor 8 and the second metal sensor 9 for detecting that a foreign matter including metal material has been attached to the card insertion part 4 and, in addition, even when a distance between the first metal sensor 8 and the second metal sensor 9 is close, an erroneous detection that a foreign matter including metal material has been attached to the card insertion part 4 can be prevented.

Further, in this embodiment, the first control section 30 determines whether the second metal sensor 9 is disposed at a normal position or not based on an output value of the first detection coil 17A when a current is supplied to the second excitation coil 16B, and the second control section 40 determines whether the first metal sensor 8 is disposed at a normal position or not based on an output value of the second detection coil 17B when a current is supplied to the first excitation coil 16A. Therefore, even when a structure for detecting that the first metal sensor 8 and the second metal sensor 9 are not detached illegally is not provided separately, it can be detected that the second metal sensor 9 is not illegally detached based on an output value of the first detection coil 17A and it can be detected that the first metal sensor 8 is not illegally detached based on an output value of the second detection coil 17B. Accordingly, in this embodiment, a structure of the card reader 1 can be simplified.

Further, in this embodiment, the first control section 30 detects that the voltage value "V11" is larger than the threshold value "Vr2" for determining whether the second metal sensor 9 is disposed at a normal position or not and, after that, the first control section 30 detects that the voltage value "V11" becomes not more than the threshold value "Vr2" and thereby the first control section 30 indirectly detects that supply of the current to the second excitation coil 16B is stopped. In other words, in this embodiment, the first control section 30 determines whether supply of a current to the second excitation coil 16B is stopped or not based on an output value of the first detection coil 17A when supply of a current to the first excitation coil 16A is in a stopped state. Further, the second control section 40 detects that the voltage value "V21" is larger than the threshold value "Vr1" for determining whether the first metal sensor 8 is disposed at a normal position or not and, after that, the second control section 40 detects that the voltage value "V21" becomes not more than the threshold value "Vr1" and thereby the second control section 40 indirectly detects that supply of the current to the first excitation coil 16A is stopped. In other words, in this embodiment, the second control section 40 determines whether supply of a current to the first excitation coil 16A is stopped or not based on an output value of the second detection coil 17B when supply of a current to the second excitation coil 16B is in a stopped state.

Therefore, according to this embodiment, a signal notifying that supply of a current to the first excitation coil 16A is stopped is not required to transmit from the first control section 30 to the second control section 40 through the host control section 11 and, further, a signal notifying that supply of a current to the second excitation coil 16B is stopped is not required to transmit from the second control section 40 to the first control section 30 through the host control section 11. Accordingly, in this embodiment, the number of signal lines between the card reader 1 and the host apparatus can be reduced and, as a result, a structure of the card reader 1 can be simplified.

Other Embodiments

Although the present invention has been shown and described with reference to a specific embodiment, various changes and modifications will be apparent to those skilled in the art from the teachings herein.

In the first embodiment, the control section 10 judges in the step S3 whether the voltage value "V1" acquired in the step S2 is larger than the threshold value "Vd1" or not, and thereby the control section 10 determines whether a foreign matter including metal material has been attached near the card insertion part 4 or not. However, the present invention is not limited to this embodiment. For example, it may be structured that the control section 10 calculates a variation amount (difference) between the voltage value "V1" acquired in the step S2 and the voltage value "V1" acquired in the last step S2 and determines whether the variation amount is larger than a predetermined threshold value or not, and thereby the control section 10 determines whether a foreign matter including metal material has been attached near the card insertion part 4 or not. Further, in the first embodiment, the control section 10 judges in the step S13 whether the voltage value "V2" acquired in the step S12 is larger than the threshold value "Vd2" or not, and thereby the control section 10 determines whether a foreign matter including metal material has been attached near the card insertion part 4 or not. However, it may be structured that the control section 10 calculates a variation amount between the voltage value "V2" acquired in the step S12 and the voltage value "V2" acquired in the last step S12 and determines whether the variation amount is larger than a predetermined threshold value or not, and thereby the control section 10 determines whether a foreign matter including metal material has been attached near the card insertion part 4 or not.

In this case, even when ambient temperature of the metal sensors 8 and 9 is varied, it can be appropriately determined whether a foreign matter including metal material has been attached near the card insertion part 4 or not. In this case, just after the card reader 1 is activated, it may be structured that the voltage values "V1" and "V2" at the time of activation of the card reader 1 are stored, and variation amounts are calculated between the voltage values "V1" and "V2" acquired in the first steps S2 and S12 after the card reader 1 is activated and the voltage values "V1" and "V2" at the time of the activation of the card reader 1, and then the control section 10 judges whether the variation amounts are larger than predetermined threshold values or not.

Similarly, in the second embodiment, the first control section 30 judges in the step S34 whether the voltage value "V1" acquired in the step S33 is larger than the threshold value "Vd1" or not and thereby the first control section 30 determines whether a foreign matter including metal material has been attached near the card insertion part 4 or not. However, it may be structured that the first control section 30 calculates a variation amount between the voltage value "V1" acquired in the step S33 and the voltage value "V1" acquired in the last step S33 and determines whether the variation amount is larger than a predetermined threshold value or not, and thereby the first control section 30 determines whether a foreign matter including metal material has been attached near the card insertion part 4 or not. Further, in the second embodiment, the second control section 40 judges in the step S64 whether the voltage value "V2" acquired in the step S63 is larger than the threshold value "Vd2" or not and thereby the second control section 40 determines whether a foreign matter including metal material has been attached near the card insertion part 4 or not. However, it may be structured that the second control section 40 calculates a variation amount between the voltage value "V2" acquired in the step S63 and the voltage value "V2" acquired in the last step S63 and determines whether the variation amount is larger than a predetermined threshold value or not and thereby the second control section 40 determines whether a foreign matter including metal material has been attached near the card insertion part 4 or not.

In the embodiments described above, the card reader 1 includes two metal sensors 8 and 9. However, the number of the metal sensors included in the card reader 1 may be three or more. In the first embodiment, when the number of metal sensors is three or more, all of the three or more metal sensors are connected with the control section 10 and the control section 10 supplies a current to respective excitation coils 16 of the three or more metal sensors at different timings. In other words, the control section 10 successively supplies a current to the respective excitation coils 16 of three or more metal sensors. In other words, the control section 10 supplies a current to the excitation coils 16 of three or more metal sensors one by one in order.

Further, in the second embodiment, when the number of the metal sensors is three or more, the card reader 1 includes a plurality of control sections each of which is connected with each of three or more metal sensors, and the plurality of the control sections supplies a current to the respective excitation coils 16 of the three or more metal sensors at different timings. In other words, a plurality of control sections successively supplies a current to the respective excitation coils 16 of the three or more metal sensors. In other words, a plurality of control sections supplies a current to the excitation coils 16 of the three or more metal sensors one by one in order.

In the embodiments described above, it is determined whether the first metal sensor 8 is disposed at a normal position or not based on an output value of the second detection coil 17B when a current is supplied to the first excitation coil 16A, and it is determined whether the second metal sensor 9 is disposed at a normal position or not based on an output value of the first detection coil 17A when a current is supplied to the second excitation coil 16B. However, the present invention is not limited to this embodiment. For example, a detection mechanism may be separately provided for detecting whether the first metal sensor 8 and the second metal sensor 9 are disposed at normal positions or not.

In the second embodiment, the first control section 30 detects that the voltage value "V11" is larger than the threshold value "Vr2" and, after that, detects that the voltage value "V11" becomes not more than the threshold value "Vr2" and thereby the first control section 30 indirectly detects that supply of a current to the second excitation coil 16B is stopped. Further, the second control section 40 detects that the voltage value "V21" is larger than the threshold value "Vr1" and, after that, detects that the voltage value "V21" becomes not more than the threshold value "Vr1" and thereby the second control section 40 indirectly detects that supply of a current to the first excitation coil 16A is stopped. However, the present invention is not limited to this embodiment. For example, a signal notifying that supply of a current to the first excitation coil 16A is stopped may be transmitted from the first control section 30 to the second control section 40 through the host control section 11. Further, a signal notifying that supply of a current to the second excitation coil 16B is stopped may be transmitted from the second control section 40 to the first control section 30 through the host control section 11.

In the second embodiment, a time period that a current is supplied to the first excitation coil 16A and a time period that a current is supplied to the second excitation coil 16B are set to be equal to each other. However, a time period that a current is supplied to the first excitation coil 16A and a time period that a current is supplied to the second excitation coil 16B may be different from each other. Further, in the second embodiment, the maximum time period that supply of a current to the first excitation coil 16A is stopped and the maximum time period that supply of a current to the second excitation coil 16B is stopped are set to be equal to each other. However, the maximum time period that supply of a current to the first excitation coil 16A is stopped and the maximum time period that supply of a current to the second excitation coil 16B is stopped may be different from each other.

In the embodiments described above, each of the metal sensors 8 and 9 includes a pair of excitation coils 16 (in other words, two excitation coils 16), but each of the metal sensors 8 and 9 may include one excitation coil 16. Further, in the embodiments described above, the card reader 1 is a card conveyance type card reader including a card conveying mechanism. However, a card reader to which the structure of at least an embodiment of the present invention is applied may be a manual type card reader structured to perform reading and/or recording magnetic data while a card 2 is manually moved by a user. For example, a card reader to which the structure of at least an embodiment of the present invention is applied may be a so-called dip-type card reader structured to perform reading and/or recording magnetic data when a card 2 is inserted into the card reader or when a card 2 is pulled out from the card reader.

In the embodiments described above, the card reader 1 is a card reader structured to perform processing of a card 2 formed with a magnetic stripe. However, the card reader 1 may be a card reader structured to perform processing of a contact type IC card on which no magnetic stripe is formed. In this case, for example, it is detected by the metal sensors 8 and 9 that a foreign matter (foreign matter including metal material) has been attached to the card insertion part 4 for performing so-called phishing, that is, some trick is attached by a criminal for disturbing pulling out of a card 2 from an inside of the card reader 1 and illegally acquiring the card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader comprising:
a card insertion part comprising a card insertion port is formed;
a plurality of metal sensors structured to detect whether a foreign matter including metal material has been attached near the card insertion part; and
a control section with which the plurality of the metal sensors are connected;
wherein each metal sensor comprises a core formed of magnetic material and an excitation coil and a detection coil which are wound around the core; and
wherein the control section is structured to supply a current to each of the excitation coils of the plurality of the metal sensors at different timings.

2. The card reader according to claim 1, wherein
the plurality of the metal sensors comprises a first metal sensor and a second metal sensor,
the first metal sensor comprises a first excitation coil as the excitation coil and a first detection coil as the detection coil,
the second metal sensor comprises a second excitation coil as the excitation coil and a second detection coil as the detection coil, and the control section is structured to alternately supply a current to the first excitation coil and the second excitation coil.

3. The card reader according to claim 2, wherein
the control section is structured to determine whether the second metal sensor is disposed at a normal position or not based on an output value of the first detection coil when the current is supplied to the second excitation coil, and
the control section is structured to determine whether the first metal sensor is disposed at a normal position or not based on an output value of the second detection coil when the current is supplied to the first excitation coil.

4. A card reader comprising:
a card insertion part comprising a card insertion port is formed;
a plurality of metal sensors structured to detect whether a foreign matter including metal material has been attached near the card insertion part; and
a plurality of control sections each of which is individually connected with which each of the plurality of the metal sensors is connected;
wherein each metal sensor comprises a core formed of magnetic material and an excitation coil and a detection coil which are wound around the core; and
wherein the plurality of the control sections is structured to supply a current to each of the excitation coils of the plurality of the metal sensors at different timings.

5. The card reader according to claim 4, wherein
the plurality of the metal sensors comprises a first metal sensor and a second metal sensor,
the plurality of the control sections comprises a first control section with which the first metal sensor is connected and a second control section with which the second metal sensor is connected,
the first metal sensor comprises a first excitation coil as the excitation coil and a first detection coil as the detection coil,
the second metal sensor comprises a second excitation coil as the excitation coil and a second detection coil as the detection coil,
the first control section is structured to determine whether supply of a current to the second excitation coil is stopped based on an output value of the first detection coil when supply of a current to the first excitation coil is in a stopped state and, is structured such that, when the first control section determines that the supply of the current to the second excitation coil is stopped, the first control section starts supply of a current to the first excitation coil, and
the second control section is structured to determine whether supply of a current to the first excitation coil is stopped or not based on an output value of the second detection coil when supply of a current to the second excitation coil is in a stopped state and, is structured such that, when the second control section determines that the supply of the current to the first excitation coil is stopped, the second control section starts supply of a current to the second excitation coil.

6. The card reader according to claim 5, wherein
the first control section is structured to whether the second metal sensor is disposed at a normal position or not based on an output value of the first detection coil when a current is supplied to the second excitation coil, and
the second control section is structured to whether the first metal sensor is disposed at a normal position or not based on an output value of the second detection coil when a current is supplied to the first excitation coil.

7. A control method for a card reader comprising:
a card insertion part in which a card insertion port is formed; and
a plurality of metal sensors structured to detect that a foreign matter including metal material has been attached near the card insertion part;
wherein each metal sensor comprises a core formed of magnetic material and an excitation coil and a detection coil which are wound around the core;
the control method for the card reader comprising supplying a current to each of the excitation coils of the plurality of the metal sensors at different timings.

8. The control method for the card reader according to claim 7, wherein
the plurality of the metal sensors comprises a first metal sensor and a second metal sensor,
the first metal sensor comprises a first excitation coil as the excitation coil and a first detection coil as the detection coil,
the second metal sensor comprises a second excitation coil as the excitation coil and a second detection coil as the detection coil, and
a current is alternately supplied to the first excitation coil and the second excitation coil.

9. The control method for the card reader according to claim 8, further comprising:
determining whether the second metal sensor is disposed at a normal position based on an output value of the first detection coil when the current is supplied to the second excitation coil, and
determining whether the first metal sensor is disposed at a normal position based on an output value of the second detection coil when the current is supplied to the first excitation coil.

10. The control method for the card reader according to claim 8, wherein
determining whether supply of a current to the second excitation coil is stopped based on an output value of the first detection coil when supply of a current to the first excitation coil is in a stopped state and, when the first control section determines that the supply of the current to the second excitation coil is stopped, the first control section starts supply of a current to the first excitation coil, and
determining whether supply of a current to the first excitation coil is stopped based on an output value of the second detection coil when supply of a current to the second excitation coil is in a stopped state and, when the second control section determines that the supply of the current to the first excitation coil is stopped, the second control section starts supply of a current to the second excitation coil.

* * * * *